United States Patent [19]
Rose et al.

[11] Patent Number: 6,161,862
[45] Date of Patent: Dec. 19, 2000

[54] SNAP-TOGETHER AIRBAG MODULE REACTION CANISTER

[75] Inventors: Larry D. Rose, Layton; Daniel L. Steimke, Ogden, both of Utah

[73] Assignee: Autoliv ASP, Inc., Ogden, Utah

[21] Appl. No.: 09/085,254

[22] Filed: May 26, 1998

[51] Int. Cl.[7] .................................................. B60R 21/16
[52] U.S. Cl. ............................................................ 280/728.2
[58] Field of Search ................................. 280/732, 728.2

[56] References Cited

U.S. PATENT DOCUMENTS

| | | |
|---|---|---|
| 5,069,480 | 12/1991 | Good . |
| 5,234,227 | 8/1993 | Webber . |
| 5,332,256 | 7/1994 | Lauritzen et al. . |
| 5,344,182 | 9/1994 | Lauritzen et al. . |
| 5,407,226 | 4/1995 | Lauritzen et al. . |
| 5,454,588 | 10/1995 | Rose . |
| 5,458,364 | 10/1995 | Mueller et al. . |
| 5,490,689 | 2/1996 | Garner et al. . |
| 5,511,819 | 4/1996 | Spilker et al. . |
| 5,533,747 | 7/1996 | Rose . |
| 5,538,277 | 7/1996 | Frary et al. . |
| 5,577,764 | 11/1996 | Webber et al. . |
| 5,588,667 | 12/1996 | Emambakhsh et al. . |
| 5,588,669 | 12/1996 | Leonard et al. . |
| 5,592,729 | 1/1997 | Dyer et al. . |
| 5,639,111 | 6/1997 | Spencer et al. ............... 280/728.2 |
| 5,669,627 | 9/1997 | Marjanski et al. . |
| 5,676,390 | 10/1997 | Olson . |
| 5,687,988 | 11/1997 | Storey et al. . |
| 5,732,971 | 3/1998 | Lutz ............................. 280/728.2 |
| 5,788,269 | 8/1998 | Jakovski et al. ............. 280/728.2 |
| 5,934,700 | 8/1999 | Disam et al. ................. 280/728.2 |
| 5,941,556 | 8/1999 | Rose ............................ 280/728.2 |

FOREIGN PATENT DOCUMENTS 2270882  3/1994  United Kingdom .

*Primary Examiner*—Paul N. Dickson
*Assistant Examiner*—Faye M. Fleming
*Attorney, Agent, or Firm*—Sally J. Brown

[57] ABSTRACT

Featured for use in an inflatable restraint system installation is an airbag module assembly which reduces and/or minimizes the number of fasteners incorporated therein. The airbag module assembly utilizes the inflator as a structural tension member to axially compress an end closure to a reaction canister body part. The end closure and the body part have a snap-together form of joinder to prevent disengagement of the end closure from the body part upon deployment of the associated airbag cushion.

20 Claims, 4 Drawing Sheets

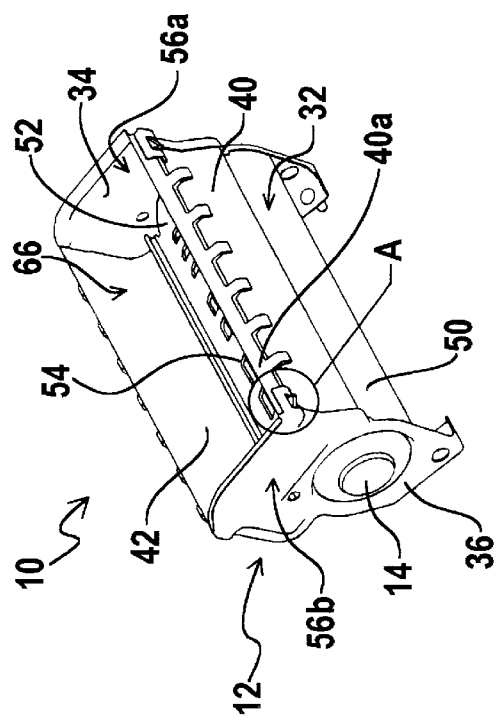
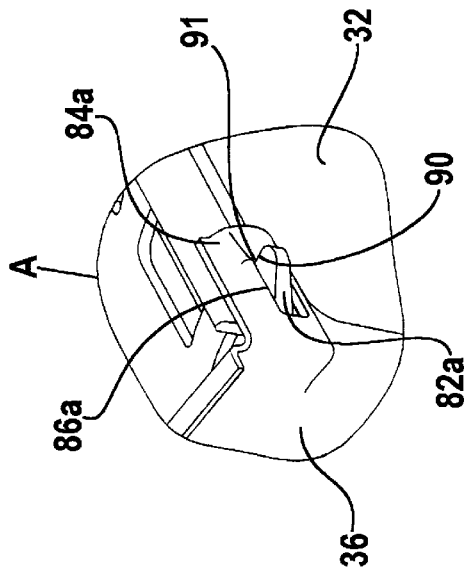
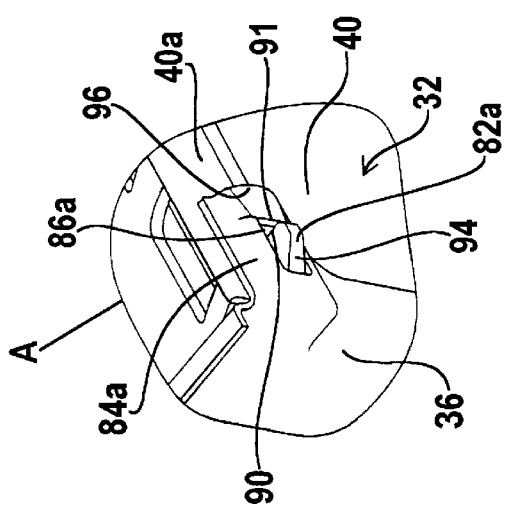

SNAP-TOGETHER AIRBAG MODULE REACTION CANISTER

BACKGROUND OF THE INVENTION

This invention relates generally to inflatable passive restraint systems for use in vehicles for restraining the movement of a seated occupant such as in the event of a collision and, more particularly, to an improvement in the structure for housing and positioning a gas generator and an inflatable bag in the vehicle.

Safety restraint systems which self-actuate from an undeployed to a deployed state without the need for intervention by the operator, i.e., "passive restraint systems," and particularly those restraint systems incorporating inflatable bags or cushions, as well as the use of such systems in motor vehicles have been the subjects of much discussion as the desirability of the use of such passive restraint systems has gained general acceptance.

Generally, it is common to utilize airbag module assemblies which include at least three basic components: 1) a cushion or airbag that is inflated with gas such as when the vehicle encounters a sudden deceleration, 2) an inflator which upon actuation serves to provide the gas used to inflate the airbag cushion, and 3) a reaction canister which typically functions as a structural housing supporting both the inflator and the airbag cushion while providing a mounting base for installation of the assembly in a vehicle and direction to the inflation gases resulting from the inflator.

Such reaction canister housing structures are typically in the form of an open-mouthed container, formed with a body portion, such as composed by one or more body parts, and with an end plate fastened at each opposed end of the container. Usually, the airbag cushion, in an uninflated and folded condition, is placed into and housed within such an open-mouth reaction canister housing.

It is known to construct reaction canister assemblies, using one or more part or parts formed by extrusion fabrication. In practice, the component parts of such prior art inflatable restraining devices, particularly the component parts of the reaction canister, e.g., the reaction canister body and the corresponding end plates, are commnonly joined and held together through the use of a multiple number of selected fasteners such as screws, rivets or bolts. For example, a selected fastener is typically passed through fastener holes which have been preformed in the respective parts to be fastened together. Such fastener holes commonly take the form of screw channels formed, during extrusion processing or otherwise, in or along the reaction canister body. Further, it is relatively common for reaction canister assemblies to rely on the inclusion and use of multiple fasteners in order for the reaction canister assembly to maintain needed or desired structural stability upon deployment of the associated airbag cushion, particularly at the chute or mouth portion of the reaction canister assembly wherethrough, upon proper actuation, the airbag cushion is deployed.

The manufacture and production of assemblies that utilize multiple fasteners typically require additional machinery and associated personnel. For example, facilities for the production of such assemblies which require multiple fasteners commonly include multiple fixture devices to effect proper fastener hole alignment for insertion of a fastener as well as a selected form or forms of driver devices in order to drive each fastener into the corresponding fastener hole. Such additional production steps slow the assembly process and increase the costs associated with such assemblies.

Furthermore, each fastener is an entity in and of itself with each such fastener needing to be secured and tightened to a specific torque, thereby complicating the assembly process. For example, in order to better ensure safety in and proper functioning of airbag module assemblies, the component parts of the assembly and typically including each fastener, as well as the particulars of each such component, is desirably recorded and tracked. Such recording and tracking operations, however, can become undesirably complicated and burdensome as the number of component parts for particular assembly designs is increased. In view thereof, airbag module assemblies are generally preferably designed to minimize the number of component parts used therein.

Thus, a relatively simple, low cost reaction canister assembly which: 1) reduces and/or minimizes the number of component parts incorporated therein and 2) reduces and/or minimizes the use of fasteners such as rivets, bolts, and screws to effect attachment and the problems associated with the use of such fasteners, such as those identified herein, is desired.

SUMMARY OF THE INVENTION

A general object of the invention is to provide improvements to the assemblies used in inflatable passive restraint systems and, more particularly, to provide improvements to the airbag module assemblies used in such systems.

A more specific objective of the invention is to overcome one or more of the problems described above.

The general object of the invention can be attained, at least in part, through an airbag module assembly which includes an inflatable airbag cushion, an inflator and a reaction canister adapted to house both the inflatable airbag cushion and the inflator in stored conditions. The inflator has a generally elongated cylindrical shape and upon actuation is adapted to provide gas used to inflate the airbag cushion. The reaction canister includes a reaction canister body portion and first and second end closures. The reaction canister body portion is composed of first and second opposite side walls and a bridging portion joining the first and second opposite side walls. The first and second end closures are joined to a respectively associated opposite open end of the body portion. Each of the first and second end closures includes a generally planar portion having first and second sections. The first sections of each of the first and second end closures together with the body portion define a first volume adapted to receive the inflator. The second sections of each of the first and second end closures together with the body portion define a second volume adapted to normally store the airbag cushion. In the assembly of the first and second end closures to the respective opposite ends of the body portion, the inflator is received within the first volume securing engagement of the body portion and the first sections of the first and second end closures whereby the first section of the first end closure is axially compressed to the first end of the body portion and the first section of the second end closure is axially compressed to the second end of the body portion. Also, at least the second section of the first end closure and the body portion have a snap-together form of joinder to prevent disengagement of the second section of the first end closure from the body portion upon deployment of the airbag cushion.

The prior art fails to provide a relatively simple, low cost airbag module assembly which, to the extent desired: 1) reduces and/or minimizes the number of component parts incorporated therein and 2) reduces and/or minimizes the use of fasteners such as rivets, bolts, and screws to effect attachment and the problems associated with the use of such fasteners, such as those identified herein.

The invention further comprehends a passenger side airbag module assembly including an inflatable passenger side airbag cushion, a generally elongated cylindrical passenger side inflator which upon actuation is adapted to provide gas used to inflate the airbag cushion and a passenger side reaction canister adapted to house both the inflator and the inflatable airbag cushion in stored conditions. The reaction canister includes an extruded one-piece body part having first and second opposite side walls, a bridging portion joining the first and second opposite side walls, and open first and second opposite ends. The reaction canister also includes first and second end closures joined to a respectively associated opposite end of the body part. The first and second end closures each include a generally planar portion having first and second sections. The first sections of the first and second end closures together with the body part define a first volume adapted to receive the inflator. The second sections of the first and second end closures together with the body part define a second volume adapted to normally store the airbag cushion. In the assembly of the first and second end closures to the respective opposite ends of the body part, the inflator is received within the first volume and secures engagement of the body part and the first sections of the first and second end closures whereby the first section of the first end closure is axially compressed to the first end of the body part and the first section of the second end closure is axially compressed to the second end of the body part. Also, at least the second section of the first end closure and the body part have a snap-together form of joinder to prevent disengagement of the second section of the first end closure from the body part upon deployment of the airbag cushion. The snap-together form of joinder comprising: the first end of the body part including at least first and second spaced apart generally outwardly extending protrusions and the first end closure including at least first and second projections from the second section thereof, each of the projections including at least one opening. Upon joinder of the first end closure with the body part, the first protrusion is received within the at least one opening of the first projection and the second protrusion is received within the at least one opening of the second projection. Upon deployment of the airbag cushion, the at least one opening of the first projection matingly engages the first protrusion and the at least one opening of the second projection matingly engages the second protrusion to prevent disengagement of the second section of the first end closure from the body part.

The invention still further comprehends a passenger side airbag module assembly which includes an inflatable passenger side airbag cushion, a generally elongated cylindrical passenger side inflator and a passenger side reaction canister. The inflator, upon actuation, is adapted to provide gas used to inflate the airbag cushion. The reaction canister is adapted to house both the inflator and the inflatable airbag cushion in stored conditions.

The reaction canister includes a continuously extruded aluminum one-piece body part. The body part has first and second opposite side walls, a bridging portion joining the first and second opposite side walls, and open first and second opposite ends. The reaction canister also includes first and second end closures joined to a respectively associated opposite end of the body part. The first and second end closures each include a generally planar portion having first and second sections. The first sections of the first and second end closures together with the body part define a first volume adapted to receive the inflator. The second sections of the first and second end closures together with the body part define a second volume adapted to normally store the airbag cushion.

In the assembly of the first and second end closures to the respective opposite ends of the body part, the inflator is received within the first volume securing engagement of the body part and the first sections of the first and second end closures whereby the first section of the first end closure is axially compressed to the first end of the body part and the first section of the second end closure is axially compressed to the second end of the body part. In such assembly, the second section of the first end closure and the body part have a snap-together form of joinder to prevent disengagement of the second section of the first end closure from the body part upon deployment of the airbag cushion. Also, the second section of the second end closure and the body part have a snap-together form of joinder to prevent disengagement of the second section of the second end closure from the body part upon deployment of the airbag cushion.

As used herein, references to "extrusion" and "conventional extrusion" are to be understood to delineate from impact processing. Specifically, extrusion generally refers to a fundamental processing operation in many industries in which a material is forced through a metal forming die, followed by cooling or chemical hardening. In contrast, in impact processing, a part is formed in a confining die from a metal slug, usually cold, by a single stroke application of force through a punch causing the metal to flow around the punch. While impacts are suited for the making of hollow parts that have one end totally closed, an extrusion rather than an impact is better suited for the formation of a tubular outside wall with open ends, such as described later herein.

Other objects and advantages will be apparent to those skilled in the art from the following detailed description taken in conjunction with the appended claims and drawings.

BRIEF DESCRIPTION OF THE DRAWINGS

FIG. 2 is a simplified perspective view of the airbag module assembly of FIG. 1 in an assembled state.

FIG. 3 is fragmentary detail view of the portion of the airbag module assembly shown in FIG. 2 encircled within A and shown in a pre-deployment state.

FIG. 4 is fragmentary detail view of the portion of the airbag module assembly shown in FIG. 2 encircled within A and shown in a state upon deployment of the associated airbag cushion.

DETAILED DESCRIPTION OF THE INVENTION

Figure 1:
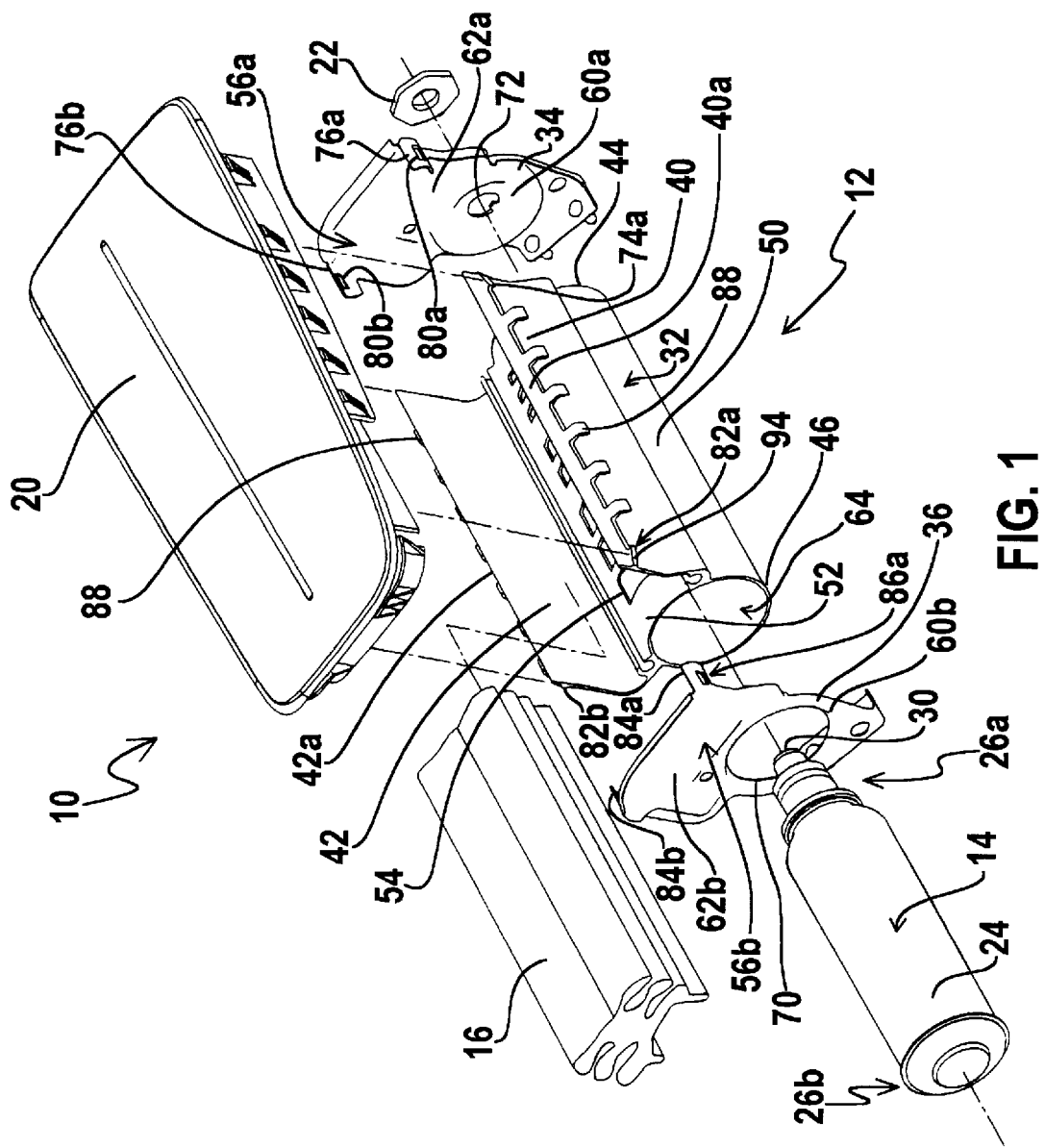
FIG. 1 is a simplified partially exploded perspective view of an airbag module assembly in accordance with one embodiment of the invention.

The present invention, as is described in more detail below, provides an improved reaction canister assembly for use in inflatable passive restraint systems for use in vehicles for restraining the movement of a seated occupant during a collision.

While the invention is described below with particular reference to a passenger side airbag module assembly for automotive vehicles including vans, pick-up trucks, and particularly automobiles, it is to be understood that the invention also has applicability not only with other types or kinds of vehicles including, for example, airplanes, but also can, if desired, be used with other types or kinds of airbag module assemblies for automotive vehicles including, for example, driver side and side impact airbag assemblies. With respect to automotive vehicles it will also be appreciated that due to usual physical differences between passenger, side impact and driver side airbag module assemblies, including the typical difference in size with passenger side airbags generally being much larger than those used in side impact and driver side assemblies, the invention has particular initial utility in passenger side airbag module assemblies.

Referring to the drawings and initially referring particularly to FIGS. 1–4, there is illustrated an airbag module assembly, generally designated by the reference numeral 10, in accordance with one embodiment of the invention. It is to be understood that in the practice of the invention, such an airbag module assembly is commonly housed in or secured to any appropriate cooperating portion of the vehicle. In the case of a passenger side module installation, such an assembly is normally housed in what is alternatively commonly referred to as the instrument panel or dashboard (not shown) of the vehicle opposite the passenger seat. In the case of a driver side module installation, such an assembly is typically housed in or secured to the steering wheel.

The airbag module assembly 10 is a generally self-contained unit, the primary components of which include a reaction canister assembly 12, an inflatable restraint system inflator 14, an inflatable airbag cushion 16, a module cover 20 generally designed to provide closure to either or both the reaction canister assembly 12 and the module assembly 10, and a nut 22 for further securing the inflator 14 within the reaction canister assembly 12.

The inflator 14 is generally elongated and cylindrical in shape. Upon actuation, the inflator 14 is adapted to provide gas used to inflate the airbag cushion 16. The inflator 14 includes a chamber portion 24 and first and second end portions 26a and 26b, respectively. As shown, the inflator chamber portion 24 may desirably have the general form of a tube. The inflator 14 is an end discharge inflator which discharges inflation gas from one end therefrom, e.g., the end 26a. It will be appreciated, however, that the invention in its broader application and practice is not so limited. For example, the invention can, if desired, be practiced in conjunction with an inflator having gas exit vents or ports spaced along the circumference of the inflator chamber and arranged along the length thereof The inflator end 26a also includes a threaded keyed stud 30, such as is common to such inflator devices.

The reaction canister assembly 12 is adapted to house both the inflator 14 and the inflatable airbag cushion 16. The reaction canister assembly 12 includes a body portion 32, in the form of a one-piece extrusion, and first and second end closures, 34 and 36, respectively.

Such a one-piece extruded body part can be made from various materials including, for example, various polymer or plastic materials and light weight metals including, for example, magnesium. A typical or common material of which such body parts can be made is aluminum which desirably provides or results in a part having relatively high strength and low weight.

Reaction canister end closures or plates are commonly fabricated of stamped steel. As will be appreciated and in accordance with the invention, however, variously formed or fabricated end closures can be used. Such end closures may, for example and if desired, be formed of one or more light metals, such as aluminum, in stamped or cast forms.

The body part 32 has the general form of a long, narrow, open receptacle or trough and includes first and second opposite side walls or panels, 40 and 42, respectively, and first and second opposite ends, 44 and 46, respectively. The side walls, 40 and 42, respectively, are generally spaced apart and joined together by way of a body part bridging portion 50. For example, as shown in the illustrated embodiment, the side walls 40 and 42 are desirably formed directly continuous with the integrally shaped bridging portion 50.

The reaction canister side walls 40 and 42 (also sometimes commonly referred to as "legs") each include what is termed a free end, individually designated 40a and 42a, respectively. Each such side wall free end is generally disposed on the respective end wall opposite the bridging portion 50. Such side wall free ends are relatively unencumbered and can thus provide relative flexibility or elasticity which, as described in greater detail below, can facilitate desired assembly.

The bridging portion 50, e.g., that portion of the reaction canister body part 32 extending between and joining the respective side walls 40 and 42, is generally in the form of a continuous circumference tubular diffuser 52 wherein, in the assembled airbag module, the inflator chamber tube portion 24 is held in coaxial relation. Such a continuous circumference diffuser is specifically described in commonly assigned Lauritzen et al., U.S. Pat. No. 5,332,256, issued Jul. 26, 1994, the disclosure of which is fully incorporated herein by reference.

Spaced inflation gas exit ports or slots 54 are provided in the diffuser tube bridging portion 52 that faces the adjoining airbag cushion 16 to permit inflation gas fluid communication between the inflator 14 and the associated airbag cushion 16.

As will be described in greater detail below, the first and second end closures, 34 and 36, respectively, are joined to a respectively associated body part opposite end, 44 and 46, respectively. Each of the first and second end closures, 34 and 36, includes a generally planar portion 56a and 56b, respectively having a first or lower section (60a and 60b, respectively) and a second or upper section (62a and 62b, respectively). The end closure first sections 60a and 60b together with the body part 32 define a first volume 64 (sometimes referred to as an inflator storage "volume" or "cavity") adapted to receive the inflator 14. The end closure second sections 62a and 62b together with the body part 32 define a second volume 66 (sometimes referred to as an airbag cushion storage "volume" or "cavity" and perhaps best viewed by reference to FIG. 2) adapted to normally store the airbag cushion 16.

In order to permit the inflator 14 to be inserted into the airbag module assembly as a latter step or operation in the assembly process, a circular opening 70 is provided in the end closure 36. The size of the opening 70 is such as to allow the inflator end portion 26a to be inserted therethrough and to then fit in mating engagement about the inflator end portion 26b. The end closure 34 is provided with a smaller keyed slot opening 72 with which the threaded stud 30 projecting from the inflator end portion 26a fits in mating engagement.

The nut 22 is placed on the stud 30 such as to axially compress the section 60a of the end closure 34 to the end 44 of the body part 32 and the section 60b of the end closure 36 to the end 46 of the body part 32. In this way, the inflator 14 serves as a structural tension member within the assembled airbag module assembly 10.

In accordance with one aspect of the invention, the body part 32 and each of the end closures, 34 and 36, respectively, have a snap-together form of joinder, joining the end closures 34 and 36 to the body part 32 and preventing disengagement of the first and second end closure second sections, 62a, and 62b, respectively, from the body part 32 upon the occurrence of a deployment of the airbag cushion 16.

At the body part first end 44, such snap-together form of joinder is formed by the body part first end 44 including a protrusion 74a outwardly extending from the side wall 40 and proximate to the side wall free end 40a. A similarly outwardly extending protrusion (not shown) is formed on the side wall 42, proximate to the side wall free end 42a, at the body part first end 44. The first end closure upper section 62a in turn includes corresponding first and second projections, 76a and 76b, respectively. In the assembly 10 and as shown, the end closure projections 76a and 76b extend generally perpendicularly from the end closure 34 towards the body 32. Each of the projections 76a and 76b includes an opening, individually designated, 80a and 80b, respectively.

Upon joinder of the end closure 34 with the body part 32, the protrusion 74a is received within the first projection opening 80a. Similarly, the oppositely disposed protrusion on the side wall 42 is received within the second projection opening 80b. As will be described in greater detail below, with such joinder the protrusions do not normally forcefully interact with the associated projection openings.

Such joinder can be realized as each of the protrusions can be moved relative to the corresponding projection opening as, for example, the protrusions are formed on the relatively unencumbered side wall free ends, 40a and 42a, respectively. As will be appreciated, such free ends thus can provide flexibility or elasticity to the structure such as to permit such side wall free ends to be squeezed or otherwise forced closer together whereby the protrusions can be received within the respective projection openings of the respective and relatively fixed end closure.

Similarly, at the body part second end 46, such snap-together form of joinder is formed by the body part second end 46 including a first and a second spaced apart generally outwardly extending protrusion, 82a and 82b, respectively. As with the body part first end 44, the protrusions 82a and 82b are formed on the side walls 40 and 42 proximate to the side wall free ends 40a and 42a, respectively.

The second end closure upper section 62b in turn includes corresponding first and second projections 84a and 84b, respectively. Each of the projections 84a and 84b includes an opening. In FIG. 1 the opening, designated 86a, in the projection 84a is visible.

Upon joinder of the second end closure 36 with the body part 32, the protrusion 82a is received within the projection opening 86a and the protrusion 82b is received within the opening in the projection 84b.

Also, similarly, the protrusions 82a and 82b can be moved relative to projections 84a and 84b, respectively, as, for example, the protrusions are formed on the relatively unencumbered free end of the side walls, 40 and 42, respectively, and such side walls can thus provide required flexibility or elasticity to permit the protrusions to be received within the respective projection openings.

To permit a better understanding and appreciation of such joinder, a process in accordance with one preferred embodiment of the invention by which such an airbag module is assembled, will now be described.

First, one of the end closures, here the end closure 36, is joined to the body part end 46. Such joinder can be realized by placing the body part 32 in a fixture effective to squeeze or otherwise force together the relatively unencumbered, and thus somewhat flexible side wall free ends, 40a and 42a, respectively, to permit the protrusions to be aligned with the corresponding end closure projection openings. When the protrusions and the projection openings have been aligned, the squeezing of the side wall free ends 40a and 42a can be discontinued to place the protrusions and the corresponding projection openings in register, with the protrusions 82a and 82b, respectively, received within the corresponding openings in the projections 84a and 84b. In accordance with a preferred embodiment of the invention and upon discontinuation of the squeezing together of the side wall free ends 40a and 42a, the side walls 40 and 42 will each serve to apply a constant outward static force on the end closure projections 84a and 84b, respectively, and thus serve to prevent looseness or rattle by or between the body part 32 and the end closure 36.

As a next step in the assembly process, the airbag cushion 16 is installed into the body part 32 such as in a manner known in the art such as described in greater detail in commonly assigned Lauritzen et al., U.S. Pat. No. 5,344,182, issued Sep. 6, 1994; Rose, U.S. Pat. No. 5,454,588, issued Oct. 3, 1995; and Dyer et al, U.S. Pat. No. 5,592,729, issued Jan. 14, 1997, the disclosures of which are fully incorporated herein by reference.

As will be appreciated, the partially joined end closure 36 serves as an end containment or stop for the airbag cushion 16 upon the axial insertion of the airbag cushion into the body part 32, such as in a preferred manner as described in the above-referenced commonly assigned patents.

The remaining or other end closure, here the end closure 34, is then joined to the body part 32 in a manner similar to the above-described joinder of the end closure 36 to the body part 32. More specifically, the body part 32 is placed in a fixture effective to squeeze or otherwise force the side wall free ends 40a and 42a towards each other to permit the protrusions from the side walls 40 and 42 to be aligned with the corresponding projection openings 80a and 80b of the end closure 34. When the protrusions and the projection openings have been aligned, the squeezing of the side wall free ends 40a and 42a can be discontinued to place the protrusions at the reaction canister end 44 and the projection openings of the end closure 34 in register, with the protrusions received within the corresponding projection openings.

Similar to the above-described joinder of the end closure 36 with the body part 32, upon discontinuation of the squeezing together of the side wall free ends 40a and 42a, the side walls 40 and 42 can desirably each serve to apply a constant outward static force on the end closure projections 76a and 76b, respectively, and thus serve to prevent looseness or rattle by or between the body part 32 and the end closure 34.

The airbag module assembly process then proceeds with the installation of the inflator 14 into the partially completed assembly. As will be appreciated, such installation typically will involve insertion of the inflator end 26a through the end closure opening 70 and through the tubular diffuser 52, with the threaded keyed stud 30 at the inflator end 26a snugly received in the keyed slot 72 in the end closure 34. The size of the opening 70 is such as to allow the inflator end 26a to be inserted therethrough with the inflator end portion 26b fitting in mating engagement with the end closure opening 70.

As described above, the nut 22 is placed on the stud 30 and properly secured and tightened, such as to a specifically desired torque, such as to axially compress the section 60a of the end closure 34 to the end 44 of the body part 32 and the section 60b of the end closure 36 to the end 46 of the body part 32. In this way, the inflator 14 serves as a structural tension member within the assembled airbag module assembly 10. It will be appreciated that such assembly axial compression will generally serve to desirably reduce the possibility or eliminate the occurrence of looseness between or rattling by such adjacent parts, at least in the axial direction.

The assembly 10 is then completed through the attachment of the module cover 20. One cover attachment technique which can, if desired, be used is shown and described in commonly assigned Leonard et al., U.S. Pat. No. 5,588,669, issued Dec. 31, 1996, the disclosure of which is fully incorporated herein by reference. In accordance with such cover attachment technique, slots extending from the cover are mated with mounting tabs 88 such as formed by notching flanges formed at the side wall free ends, 40a and 42a, respectively. As will be appreciated, various forms or means of cover attachment can be used. As the subject invention is not generally limited by the form or means used to attach the cover, the techniques or means of cover attachment will not be further described herein.

In accordance with one preferred embodiment of the invention, when in the module assembly is in an assembled and pre-deployed state, with the inflator 14 serving as a structural tension member, the side wall outwardly extending protrusions and the corresponding end closure projection openings are spaced apart such that the protrusions and the edge surfaces of the corresponding end closure projection openings generally avoid direct contact, particularly in the axial direction, and thereby desirably provides dimensional tolerance during module assembly.

Such joinder is described in greater detail below with reference to detail drawing FIG. 3. More specifically, FIG. 3 is fragmentary detail view of the portion of the airbag module assembly shown in FIG. 2 encircled within A and shown in a pre-deployment state.

In particular, FIG. 3 shows the joinder of the end closure 36 with the body part 32, with the opening 86a of the end closure projection 84a in register with the protrusion 82a received therewithin. As shown and as will be described in greater detail below with reference to FIG. 4, the protrusion 82a includes an undercut portion 90. In the pre-deployment state shown in FIG. 3, the protrusion 82a is spaced from the edge surfaces of the opening 86a, including the edge surface designated by the reference numeral 91, such that the protrusion 82a desirably avoids direct contact with the edge surfaces of the opening 86a, particularly in the axial direction.

While the projection opening 86a is shown as having a rectangular cross sectional shape, it is to be understood that the invention, in its broader practice is not so limited and other appropriately shaped and sized openings can, if desired, be used.

Joinder of the end closures to the body part in the manner described above not only serves as an aid in the assembly of the module by providing an end containment or stop for the airbag cushion upon the axial insertion of the airbag cushion into the body part and by maintaining the end closures and body part properly positioned prior to the securing of the inflator in the assembly, but also serves to prevent disengagement of the end closures from the body part upon the deployment of the airbag cushion.

In a preferred practice of the invention, during or upon deployment of the associated airbag cushion, internal module breakout pressure forces the sidewall outwardly extending protrusions and the corresponding end closure projection openings into interlocking contact.

Turning to FIG. 4 there is illustrated a fragmentary detail view of the portion of the airbag module assembly 10 shown in FIG. 2 encircled within A and shown in a state upon deployment of the associated airbag cushion. Upon deployment, the internal module breakout pressure forces the edge surface of the opening 86a, designated by the reference numeral 91, to interlock with the protrusion undercut portion 90. In accordance with such a preferred practice, such interlocking action serves to maintain the structural stability of the reaction canister assembly in the chute area which is normally only accomplished through the use of fasteners such as screws, rivets or bolts.

While the invention has been described above with reference to an assembly process wherein the body part side walls 40 and 42 and particularly the side wall free ends 40a and 42a are desirably squeezed or otherwise forced towards each other such as to facilitate the snap-together joinder of corresponding body part side wall protrusions and end closure projection openings, the broader practice of the invention is not so limited. For example, it will be appreciated that one or more of the end closures can, if desired, alternatively or in addition be placed in snap-together joinder with the respective body portion part or parts through an assembly process wherein an axially directed force is applied to the end closure such that a projection opening of the end closure is forced over the respective body portion protrusion.

Further, selected assembly components may incorporate one or more features directed to facilitating such an alternative assembly process. For example, as shown in FIG. 1, particularly with respect to protrusion 82a, the protrusions may have a tapered lead surface 94. Such a tapered lead surface 94 is also shown in FIG. 3. Alternatively or in addition, the end closure projections, as shown in FIG. 3 with reference to the end closure projection 84a, may include a tapered lead edge, designated by the reference numeral 96. As will be appreciated, such tapered lead surface protrusions and tapered lead edge projections may more easily be forced together and joined upon application of an axially directed force, as described above.

Also, while the invention has been described above with reference to FIGS. 1–4 and an airbag module assembly wherein the reaction canister body portion part has the form of a continuous circumference tubular diffuser chamber wherein an inflator chamber tube is held in coaxial relation, it will be appreciated that the invention is not necessarily so limited. For example, other forms and types of body part bridging portions can be utilized in the practice of the invention.

Figure 5:
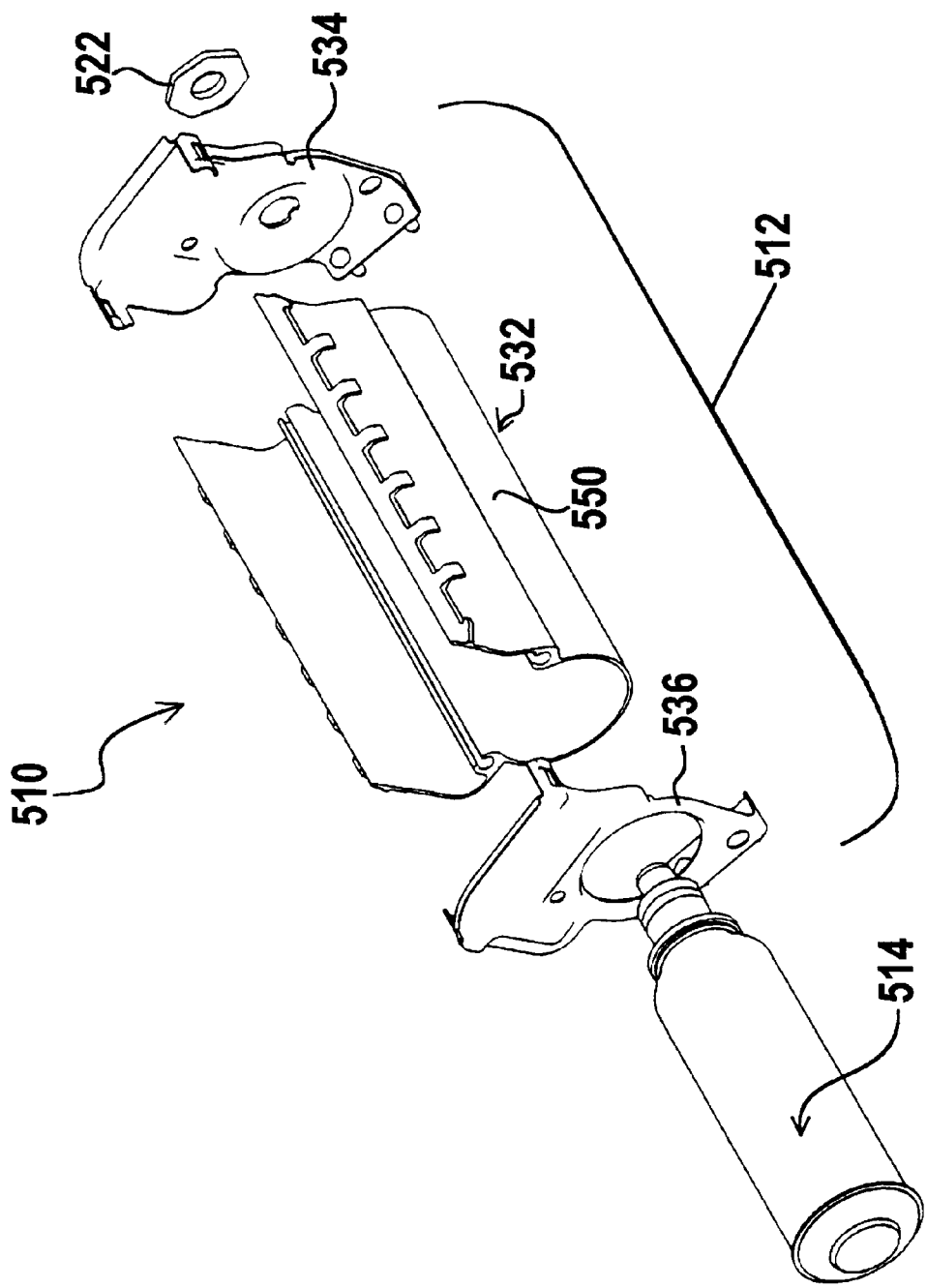
FIG. 5 is a simplified partially exploded perspective view of an airbag module assembly in accordance with an alternative embodiment of the invention.

For example, turning to FIG. 5, there is illustrated an airbag module assembly 510 generally similar to the airbag module assembly 10 described above. As with the module assembly 10, the module assembly 510 includes a reaction canister assembly 512, an inflatable restraint system inflator 514 and a nut 522 for further securing the inflator 514 within the reaction canister assembly 512. FIG. 5 has been simplified by not showing the associated airbag cushion and module cover, which may generally be similar to those shown in the assembly of FIG. 1.

The reaction canister assembly 512 is similarly composed of a reaction canister body part 532 and end closures, 534 and 536, respectively. In the module assembly 510, however, the reaction canister body part 532 incorporates a bridging portion 550 in the form of an inflator holder having a generally circular cross section extending less than 360° wherein in an inflator-containing, inflatable passive restraint system, an inflator chamber tube is held in coaxial relation, such as disclosed in commonly assigned Lauritzen et al., U.S. Pat. No. 5,407,226, issued Apr. 18, 1995, the disclosure of which is fully incorporated herein be reference.

The process of assembly and joinder of the respective components for the module assembly 510 are generally similar to those described above relative to the module assembly 10 and thus not here repeated.

As will be appreciated, other reaction canister body portion forms can, if desired, be used in the practice of the invention and are encompassed by the broader disclosure of the subject invention contained herein. For example, the reaction canister body portion can, if desired, alternatively be composed of multiple parts joined together such as specifically described in commonly assigned Rose, U.S. Pat. No. 5,533,747, issued Jul. 9, 1996, the disclosure of which is fully incorporated herein by reference.

Figure 6:
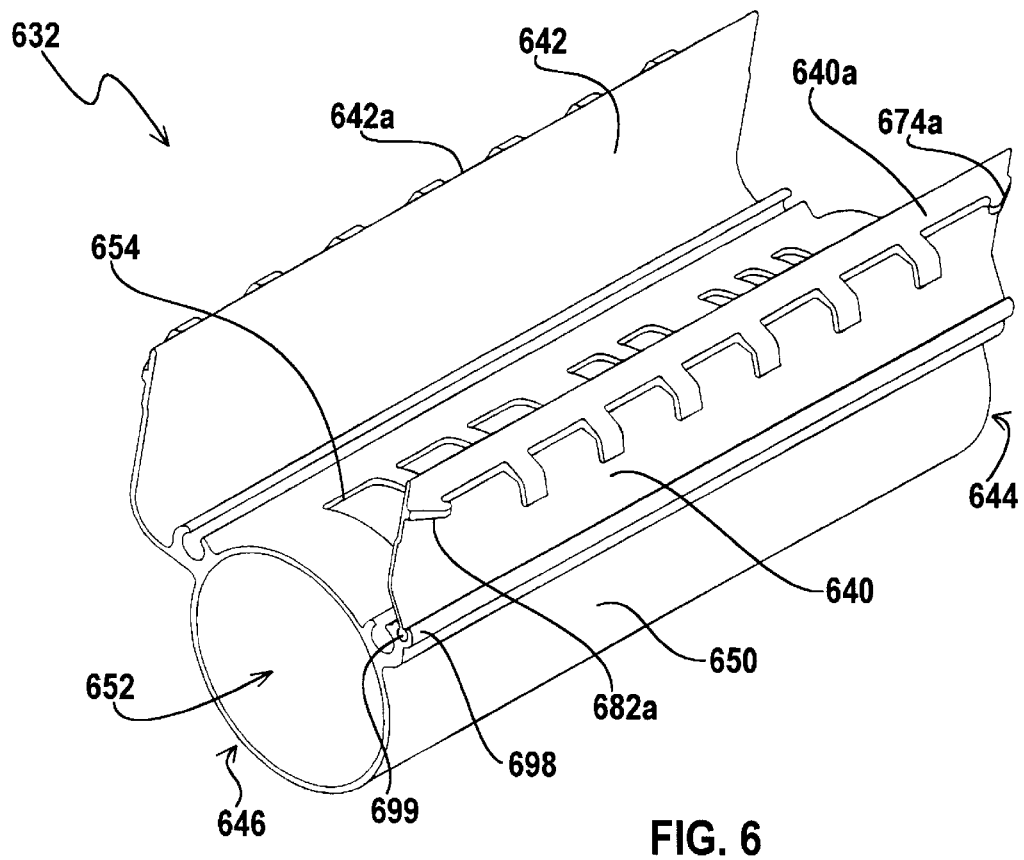
FIG. 6 is a simplified perspective view of a multiple piece reaction canister body portion of an airbag module assembly in accordance with another alternative embodiment of the invention.
Figure 7:
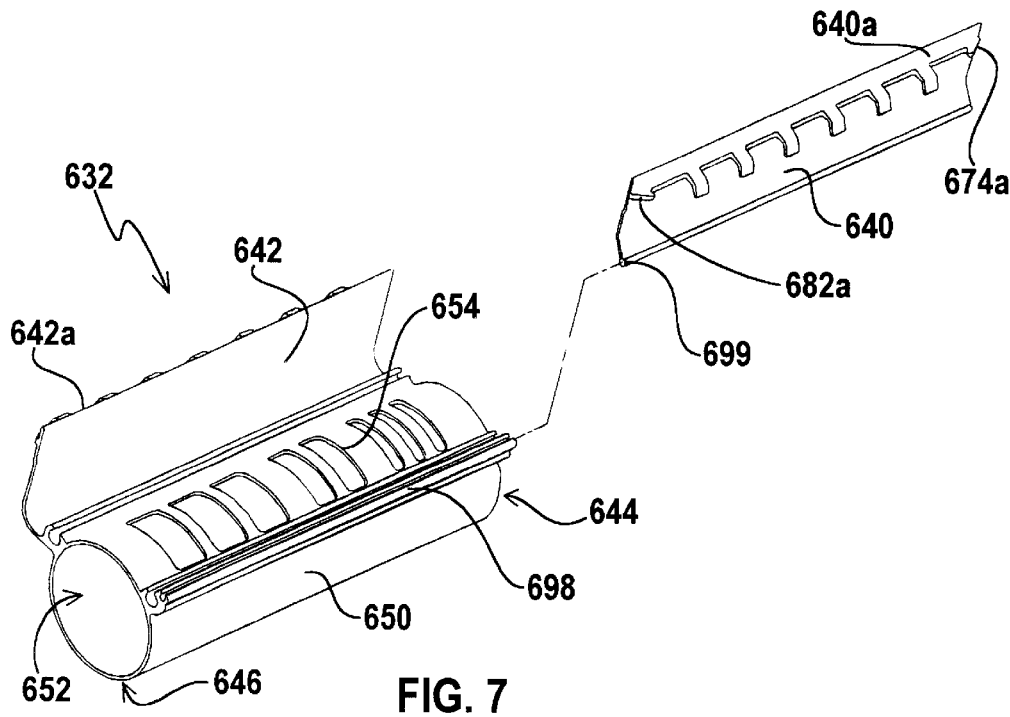
FIG. 7 is a simplified exploded perspective view of the multiple piece reaction canister body portion shown in FIG. 6.

FIGS. 6 and 7 illustrate one such multiple piece or part reaction canister body portion, generally designated by the reference numeral 632. The reaction canister body portion 632 is generally similar to the above-described body part 32 in that it has the general form of a long, narrow, open receptacle or trough and includes first and second opposite side walls or panels, 640 and 642, respectively, and first and second opposite ends, 644 and 646, respectively. The side walls, 640 and 642, respectively, are generally spaced apart and joined together by way of a body part bridging portion 650.

The bridging portion 650 is in the form of a continuous circumference tubular diffuser 652 which includes spaced inflation gas exit ports or slots 654 to permit inflation gas fluid communication between the associated airbag inflator and airbag cushion (not shown). In this illustrated embodiment, the bridging portion 650 and the side wall 642 are of a one piece construction such as a one piece extrusion. As with previously described embodiments, other reaction canister body portion forms can, if desired, be used in the practice of the invention and are encompassed by the broader disclosure of the subject invention contained herein.

The reaction canister side walls 640 and 642 each include a free end, individually designated 640a and 642a, respectively. The side wall 640 includes joinder protrusions 674a and 682a, similar to the protrusions 74a and 82a, described above. The reaction canister body portion 632 differs from the above-described body part 32, however, in that the side wall 640 is a separate piece joined with the bridging portion 650, such as in a manner similar to the above-identified U.S. Pat. No. 5,533,747. More specifically, the bridging portion 650 includes an elongated, generally U-shaped pivot channel 698 on the outer side thereof The side wall 640 is bounded along a bottom edge by a cylindrical bead 699 which, as may be better appreciated by specific reference to FIG. 7, is slidably insertable into the pivot channel 698.

As described in the above-identified U.S. Pat. No. 5,533,747, such a separate side wall piece may be extruded separately from the bridging portion and may be extruded substantially thinner than the walls of the bridging portion such as may be desired to facilitate the side wall desirably collapsing or buckling upon application of a specified impact load thereon.

While the reaction canister body portion 632 is primarily composed of two parts, i.e., the side wall 640 and the bridging portion 650 with the side wall 642 in one piece construction therewith, various alternative body portion arrangements are possible and are encompassed herewithin. For example, the side wall 642, similar to the side wall 640, can be formed as a separate piece.

As described above, only one inflator fastener is used or required to complete the specifically described module assemblies.

The invention thus provides a relatively simple, low cost airbag module assembly which: 1) reduces and/or minimizes the number of component parts incorporated therein and 2) reduces and/or minimizes the use of fasteners such as rivets, bolts, and screws to effect attachment and the problems associated with the use of such fasteners, to an extent greater than easily previously attainable.

For example, it will be appreciated that the end closure joinder of the invention, with the reduction and/or minimization of the use of fasteners may also have associated with it a reduction in module assembly weight and cost, specifically the weight and cost associated with the reaction canister assembly, such as through the elimination or reduction for the need or presence or screw channel preparations, such as normally associated with the use of such fasteners in extruded reaction canister assemblies.

Further, the elimination or minimization of reliance on such fasteners can desirably serve to reduce module scrap and rework such as that associated with problems resulting from fastener attachment and use.

As will be appreciated, the reduction and/or minimization of the number of component parts may not only simplify design and assembly but also shorten the time period needed to effect such assembly.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an airbag module assembly including an inflatable airbag cushion, a generally elongated cylindrical inflator which upon actuation is adapted to provide gas used to inflate the airbag cushion and a reaction canister adapted to house both the inflatable airbag cushion and the inflator in stored conditions wherein the reaction canister includes:

a reaction canister body portion including first and second opposite side walls and also a bridging portion joining the first and second opposite side walls, with the body portion having open first and second opposite ends and first and second end closures joined to a respectively associated opposite end of the body portion with each of the first and second end closures including a generally planar portion having first and second sections, the first sections of the first and second end closures together with the body portion defining a first volume adapted to receive the inflator and the second sections of the first and second end closures together with the body portion defining a second volume adapted to normally store the airbag cushion, wherein, in the assembly of the first and second end closures to the respective opposite ends of the body portion, the improvement comprising:

the inflator received within the first volume securing engagement of the body portion and the first sections of the first and second end closures whereby the first section of the first end closure is axially compressed to the first end of the body portion and the first section of the second end closure is axially compressed to the second end of the body portion and at least the second section of the first end closure and the body portion have a snap-together form of joinder to prevent disengagement of the second section of the first end closure from the body portion upon deployment of the airbag cushion.

2. The improvement of claim 1 wherein the snap-together form of joinder comprises:

the first end of the body portion including at least first and second spaced apart generally outwardly extending protrusions and the first end closure including at least first and second projections from the second section thereof, each of the projections including at least one opening, wherein, upon joinder of the first end closure with the body portion, the first protrusion is received within the at least one opening of the first projection and the second protrusion is received within the at least one opening of the second projection and wherein, upon deployment of the airbag cushion, the at least one opening of the first projection matingly engages the first protrusion and the at least one opening of the second projection matingly engages the second protrusion to prevent disengagement of the second section of the first end closure from the body portion.

3. The improvement of claim 1 wherein the airbag module assembly is a passenger side airbag module.

4. The improvement of claim 1 wherein the second section of the second end closure and the body portion have a snap-together form of joinder to prevent disengagement of the second section of the first end closure from the body portion upon deployment of the airbag cushion.

5. The improvement of claim 4 wherein the snap-together form of joinder of the first end closure and the body portion comprises:

the first end of the body portion including at least first and second spaced apart generally outwardly extending protrusions and the first end closure including at least first and second projections from the second section thereof, each of the projections including at least one opening, wherein, upon joinder of the first end closure with the body portion, the first protrusion is received within the at least one opening of the first projection and the second protrusion is received within the at least one opening of the second projection and wherein, upon deployment of the airbag cushion, the at least one opening of the first projection matingly engages the first protrusion and the at least one opening of the second projection matingly engages the second protrusion to prevent disengagement of the second section of the first end closure from the body portion.

6. The improvement of claim 4 wherein the snap-together form of joinder of the second end closure and the body portion comprises:

the second end of the body portion including at least first and second spaced apart generally outwardly extending protrusions and the second end closure including at least first and second projections from the second section thereof, each of the projections including at least one opening, wherein, upon joinder of the second end closure with the body portion, the first protrusion of the second end of the body portion is received within the at least one opening of the first projection of the second end closure and the second protrusion of the second end of the body portion is received within the at least one opening of the second projection of the second end closure and wherein, upon deployment of the airbag cushion, the at least one opening of the first projection of the second end closure matingly engages the first protrusion of the second end of the body portion and the at least one opening of the second projection of the second end closure matingly engages the second protrusion of the second end of the body portion to prevent disengagement of the second section of the second end closure from the body portion.

7. The improvement of claim 1 wherein the body portion is an extruded one-piece part.

8. The improvement of claim 7 wherein the body part is a continuous extrusion of aluminum.

9. The improvement of claim 1 wherein the body portion comprises a walled bridging portion part and at least one side wall part joined together.

10. The improvement of claim 9 wherein the at least one side wall part is separately extruded and is thinner than the walls of the bridging portion part.

11. The improvement of claim 1 wherein the bridging portion comprises an inflator holder having a generally circular cross section extending less than 360° wherein an inflator chamber tube is held in coaxial relation.

12. The improvement of claim 1 wherein the bridging portion comprises a continuous circumference tubular diffuser chamber wherein an inflator chamber tube is held in coaxial relation.

13. In a passenger side airbag module assembly including an inflatable passenger side airbag cushion, a generally elongated cylindrical passenger side inflator which upon actuation is adapted to provide gas used to inflate the airbag cushion and a passenger side reaction canister adapted to house both the inflator and the inflatable airbag cushion in stored conditions wherein the reaction canister includes:

an extruded one-piece body part having first and second opposite side walls and a bridging portion joining the first and second opposite side walls, with the body part having open first and second opposite ends and first and second end closures joined to a respectively associated opposite end of the body part with each of the first and second end closures including a generally planar portion having first and second sections, the first sections of the first and second end closures together with the body part defining a first volume adapted to receive the inflator and the second sections of the first and second end closures together with the body part defining a second volume adapted to normally store the airbag cushion, wherein, in the assembly of the first and second end closures to the respective opposite ends of the body part, the improvement comprising:

the inflator received within the first volume securing engagement of the body part and the first sections of the first and second end closures whereby the first section of the first end closure is axially compressed to the first end of the body part and the first section of the second end closure is axially compressed to the second end of the body part and at least the second section of the first end closure and the body part have a snap-together form of joinder to prevent disengagement of the second section of the first end closure from the body part upon deployment of the airbag cushion, the snap-together form of joinder comprising:

the first end of the body part including at least first and second spaced apart generally outwardly extending protrusions and the first end closure including at least first and second projections from the second section thereof, each of the projections including at least one opening, wherein, upon joinder of the first end closure with the body part, the first protrusion is received within the at least one opening of the first projection and the second protrusion is received within the at least one opening of the second projection and wherein, upon deployment of the airbag cushion, the at least one opening of the first projection matingly engages the first protrusion and the at least one opening of the second projection matingly engages the second protrusion to prevent disengagement of the second section of the first end closure from the body part.

14. The improvement of claim 13 wherein the second section of the second end closure and the body part have a snap-together form of joinder to prevent disengagement of the second section of the first end closure from the body part upon deployment of the airbag cushion.

15. The improvement of claim 14 wherein the snap-together form of joinder of the second end closure and the body part comprises:

the second end of the body part including at least first and second spaced apart generally outwardly extending protrusions and the second end closure including at least first and second projections from the second section thereof, each of the projections including at least one opening, wherein, upon joinder of the second end closure with the body part, the first protrusion of the second end of the body part is received within the at least one opening of the first projection of the second end closure and the second protrusion of the second end of the body part is received within the at least one opening of the second projection of the second end closure and wherein, upon deployment of the airbag cushion, the at least one opening of the first projection of the second end closure in mating engagement with the first protrusion of the second end of the body part and the at least one opening of the second projection of the second end closure in mating engagement with the second protrusion of the second end of the body part to prevent disengagement of the second section of the second end closure from the body part.

16. The improvement of claim 13 wherein the body part is a continuous extrusion of aluminum.

17. The improvement of claim 13 wherein the body part bridging portion comprises an inflator holder having a generally circular cross section extending less than 360° wherein an inflator chamber tube is held in coaxial relation.

18. The improvement of claim 13 wherein the body part bridging portion comprises a continuous circumference tubular diffuser chamber wherein an inflator chamber tube is held in coaxial relation.

19. In a passenger side airbag module assembly including an inflatable passenger side airbag cushion, a generally elongated cylindrical passenger side inflator which upon actuation is adapted to provide gas used to inflate the airbag cushion and a passenger side reaction canister adapted to house both the inflator and the inflatable airbag cushion in stored conditions wherein the reaction canister includes:

a continuously extruded aluminum one-piece body part having first and second opposite side walls and a bridging portion joining the first and second opposite side walls, with the body part having open first and second opposite ends and first and second end closures joined to a respectively associated opposite end of the body part with each of the first and second end closures including a generally planar portion having first and second sections, the first sections of the first and second end closures together with the body part defining a first volume adapted to receive the inflator and the second sections of the first and second end closures together with the body part defining a second volume adapted to normally store the airbag cushion, wherein, in the assembly of the first and second end closures to the respective opposite ends of the body part, the improvement comprising:

the inflator received within the first volume securing engagement of the body part and the first sections of the first and second end closures whereby the first section of the first end closure is axially compressed to the first end of the body part and the first section of the second end closure is axially compressed to the second end of the body part and the second section of the first end closure and the body part have a snap-together form of joinder to prevent disengagement of the second section of the first end closure from the body part upon deployment of the airbag cushion and the second section of the second end closure and the body part have a snap-together form of joinder to prevent disengagement of the second section of the second end closure from the body part upon deployment of the airbag cushion.

20. The improvement of claim 19 wherein the snap-together form of joinder of the first end closure and the body part comprises:

the first end of the body part including at least first and second spaced apart generally outwardly extending protrusions and the first end closure including at least first and second projections from the second section thereof, each of the projections including at least one opening, wherein, upon joinder of the first end closure with the body part, the first protrusion is received within the at least one opening of the first projection and the second protrusion is received within the at least one opening of the second projection and wherein, upon deployment of the airbag cushion, the at least one opening of the first projection in mating engagement with the first protrusion and the at least one opening of the second projection in mating engagement with the second protrusion to prevent disengagement of the second section of the first end closure from the body part.

* * * * *